US012634171B2

(12) United States Patent
Rusek et al.

(10) Patent No.: US 12,634,171 B2
(45) Date of Patent: May 19, 2026

(54) METHODS FOR ENABLING AND HANDLING JOINT CHANNEL ESTIMATION AND RELATED DEVICES

(71) Applicant: Sony Group Corporation, Tokyo (JP)

(72) Inventors: Fredrik Rusek, Eslöv (SE); Jose Flordelis, Lund (SE); Kun Zhao, Malmö (SE); Olof Zander, Södra Sandby (SE); Erik Bengtsson, Eslöv (SE)

(73) Assignee: Sony Group Corporation, Tokyo (JP)

( * ) Notice: Subject to any disclaimer, the term of this patent is extended or adjusted under 35 U.S.C. 154(b) by 66 days.

(21) Appl. No.: 18/697,506

(22) PCT Filed: Sep. 26, 2022

(86) PCT No.: PCT/EP2022/076715
§ 371 (c)(1),
(2) Date: Apr. 1, 2024

(87) PCT Pub. No.: WO2023/066611
PCT Pub. Date: Apr. 27, 2023

(65) Prior Publication Data
US 2024/0406033 A1      Dec. 5, 2024

(30) Foreign Application Priority Data

Oct. 22, 2021    (SE) .................................... 2151295-9

(51) Int. Cl.
*H04L 25/02*          (2006.01)
*H04L 5/00*           (2006.01)
*H04W 72/0446*        (2023.01)
(52) U.S. Cl.
CPC ........ *H04L 25/0204* (2013.01); *H04L 5/0051* (2013.01); *H04W 72/0446* (2013.01)

(58) Field of Classification Search
CPC .. H04B 7/0413; H04B 7/0697; H04B 7/0456; H04B 7/0682; H04B 7/10; H04B 7/0469;
(Continued)

(56) References Cited

U.S. PATENT DOCUMENTS 11,937,298 B2 *  3/2024  Luo ...................... H04B 7/2612
2005/0014464 A1   1/2005  Larsson
(Continued)

FOREIGN PATENT DOCUMENTS

CN          113228577 A      8/2021

OTHER PUBLICATIONS

International Search Report and Written Opinion from corresponding International Application No. PCT/EP2022/076715, mailed on Feb. 13, 2023, 21 pages.
(Continued)

*Primary Examiner* — Eva Y Puente
(74) *Attorney, Agent, or Firm* — Tucker Ellis LLP

(57) ABSTRACT

A method is disclosed performed by a first wireless node, for enabling joint channel estimation in a time domain in a network. The method comprises determining a presence of a repeater node in a transmission path between the first wireless node and a second wireless node. The repeater node is enabled to relay a transmission between the first wireless node and the second wireless node. The method comprises transmitting, to the second wireless node, an indication indicating a condition associated with phase continuity and/or power consistency of the transmission between the first wireless node and the second wireless node.

20 Claims, 7 Drawing Sheets

(58) Field of Classification Search
CPC ... H04B 7/155; H04B 7/15528; H04W 16/26;
H04W 88/04; H04W 84/047; H04W
72/0446; H04W 40/22; H04W 52/46;
H04W 72/30; H04W 16/28; H04L 27/36;
H04L 25/0391; H04L 5/005; H04L
25/0222; H04L 5/0023; H04L 27/20;
H04L 25/0224; H04L 5/0048
See application file for complete search history.

(56) References Cited

U.S. PATENT DOCUMENTS

| | | | |
|---|---|---|---|
| 2005/0190821 A1 | 9/2005 | Fujii et al. | |
| 2020/0403768 A1 | 12/2020 | Manolakos et al. | |
| 2021/0037528 A1 | 2/2021 | Nam et al. | |
| 2021/0289580 A1 | 9/2021 | Damjanovic et al. | |
| 2022/0046637 A1* | 2/2022 | Abedini | H04W 8/24 |
| 2022/0078838 A1* | 3/2022 | Abedini | H04W 72/0446 |
| 2022/0272602 A1* | 8/2022 | Huang | H04W 48/20 |
| 2023/0119776 A1* | 4/2023 | Ma | H04L 5/0051 |
| | | | 370/329 |

OTHER PUBLICATIONS

Office Action and Search Report from corresponding Swedish Application No. 2151295-9, mailed on Jun. 21, 2022, 9 pages.
Sony, "Introducing Reconfigurable Intelligent Surfaces for 5G-Advanced," 3GPP TSG RAN Rel-18 workshop Agenda Item: 4.3 RWS-210306, Jun. 28-Jul. 2, 2021, 7 pages.
InterDigital Inc., "Joint channel estimation for PUSCH," 3GPP TSG RAN WG1 #106-e, R1-2107652, Aug. 16-27, 2021, 12 pages.
Moderator (China Telecom), "[104b-e-NR-R17-CovEnh-02] Summary of email discussion on joint channel estimation for PUSCH," 3GPP TSG RAN WG1 #104bis-e, R1-2104006, 110 pages.
Soon-Ki JO et al., "Channel Estimation with Optimal Power Controls in Amplify-and-Forward Relay Networks," IEEE Wireless Communications Letters, vol. 2, No. 1, Feb. 2013, pp. 10-13.
Berna Gedik et al., "Impact of Imperfect Channel Estimation on the Performance of Amplify-and-Forward Relaying," IEEE Transactions on Wireless Communications, vol. 8, No. 3, Mar. 2009, pp. 1468-1479.

* cited by examiner

1000

S1001 Determining a presence of a repeater node in a transmission path between the first wireless node and a second wireless node

S1001A

S1003 Transmitting, to the repeater node, a second message indicative of a time duration for which the phase continuity and/or the power consistency is to be maintained by the repeater node S1005 Transmitting, to the second wireless node, an indication indicating a condition associated with phase continuity and/or power consistency of the transmission

Fig. 2

2000

S2001 Obtaining an indication indicating a condition associated with phase continuity and/or power consistency of a transmission between the first wireless node and the second wireless node

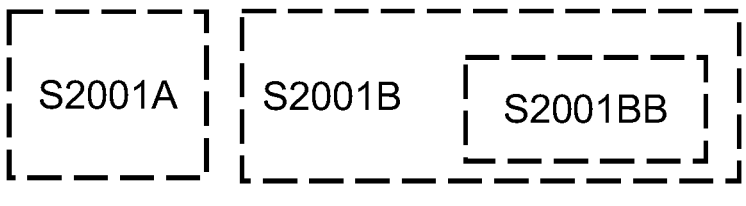

S2001A

S2001B

S2001BB

S2003 Estimating a channel condition of the transmission between the first wireless node and the second wireless node based on the condition indicated by the received message

3000

S3001 Transmitting, to the first network node, a second message, the second message indicating a capability of the repeater node S3003 Receiving, from a first network node, a message indicative of a time duration for which a phase continuity and/or the power consistency is to be maintained by the repeater node S3005 Refraining from performing one or more procedures    causing phase discontinuity and/or power inconsistency in a transmission between the first wireless node and a second wireless node

METHODS FOR ENABLING AND HANDLING JOINT CHANNEL ESTIMATION AND RELATED DEVICES

The present disclosure pertains to the field of wireless communications. The present disclosure relates to methods for enabling joint channel estimation in a time domain in a network, a method for handling joint channel estimation in the time domain in the network, a related first wireless node, a related second wireless node and a related repeater node.

BACKGROUND

In wireless communication a signal transmitted via a radio channel may get distorted or noise may be added to the signal while the signal goes through the channel. For a receiving node to properly decode a received signal, the effect on the signal from the channel, such as the distortion and noise applied by the channel to the received signal, must be filtered out. This is typically done by performing a channel estimation on the channel to estimate the characteristics of the channel that the signal has gone through.

Channel estimation may be performed on reference signals transmitted over the radio channel. Channel estimation may be performed on a single reference signal in a single slot. If a communication signal contains a plurality of reference signals in consecutive slots, then the channel can be estimated using all reference signals in all slots jointly. Estimating the channel condition using all reference signals in all slots jointly is referred to as Joint Channel Estimation (JCE). JCE provides a better channel estimation than a channel estimation based on a reference signal in a single slot.

However, if the channel conditions change between slots, JCE may not be used as effectively or may provide an inaccurate channel estimation which may reduce the quality of the transmission.

SUMMARY

Accordingly, there is a need for devices and methods for enabling and/or handling joint channel estimation in a time domain in a network, which may mitigate, alleviate or address the shortcomings existing and may provide an improved channel estimation.

A method is disclosed, performed by a first wireless node, for enabling joint channel estimation in a time domain in a network. The method comprises determining a presence of a repeater node in a transmission path between the first wireless node and a second wireless node. The repeater node is enabled to relay a transmission between the first wireless node and the second wireless node. The method comprises transmitting, to the second wireless node, an indication indicating a condition associated with phase continuity and/or power consistency of the transmission between the first wireless node and the second wireless node.

Further, a first wireless node is provided, the first wireless node comprising memory circuitry, processor circuitry, and a wireless interface. The first wireless node is configured to perform any of the methods disclosed herein for the first wireless node.

It is an advantage of the present disclosure that the first wireless node can inform the second wireless device of an existence of a repeater node in the transmission path, which potentially may have an impact, such as a negative impact, on channel estimations performed by the second wireless node. Based on the received information, the second wireless node can determine a preferred type of channel estimation to perform, such as whether to perform joint channel estimation on a plurality of reference signals or channel estimation on a single reference signal. Thereby the quality of the channel estimation can be improved.

A method is disclosed, performed by a second wireless node, for handling joint channel estimation in a time domain in a network. The method comprises obtaining an indication indicating a condition associated with phase continuity and/or power consistency of a transmission between the first wireless node and the second wireless node. The condition is associated with a repeater node enabled to relay the transmission between the first wireless node and the second wireless node. The method comprises estimating a channel condition of the transmission between the first wireless node and the second wireless node based on the indicated condition.

Further, a second wireless node is provided, the second wireless node comprising memory circuitry, processor circuitry, and a wireless interface. The second wireless node is configured to perform any of the methods disclosed herein for the second wireless node.

It is an advantage of the present disclosure that the second wireless node can be informed about a condition of the transmission which may have an impact, such as a negative impact, on channel estimations performed by the second wireless node. Based on the received information the second wireless node can determine a preferred type of channel estimation to perform, such as whether to perform joint channel estimation on a plurality of reference signals or channel estimation on a single reference signal. Thereby the quality of the channel estimation can be improved.

A method is disclosed, performed by a repeater node, for enabling joint channel estimation in a time domain in a network. The method comprises receiving, from a first network node, a message indicative of a time duration for which a phase continuity and/or the power consistency is to be maintained by the repeater node. The method comprises refraining from performing one or more procedures causing phase discontinuity and/or power inconsistency in a transmission between the first wireless node and a second wireless node relayed by the repeater node during the time duration.

Further, a repeater node is provided, the repeater node comprising memory circuitry, processor circuitry, and a wireless interface. The repeater node is configured to perform any of the methods disclosed herein for the repeater node.

It is an advantage of the present disclosure that the repeater node can be configured to refrain from performing procedures which may have an impact, such as a negative impact, on channel estimations performed by the second wireless node. By refraining from performing the procedures during the time duration where the second network node is performing channel estimations, the quality of the channel estimation can be improved.

BRIEF DESCRIPTION OF THE DRAWINGS

The above and other features and advantages of the present disclosure will become readily apparent to those skilled in the art by the following detailed description of examples thereof with reference to the attached drawings, in which:

FIG. 2 is a flow-chart illustrating an example method, performed in a first wireless node, for enabling joint channel estimation in a time domain in a network according to this disclosure, FIG. 3 is a flow-chart illustrating an example method, performed in a second wireless node of a wireless communication system, for handling joint channel estimation in a time domain in a network according to this disclosure, FIG. 4 is a flow-chart illustrating an example method, performed in a repeater node of a wireless communication system, for enabling joint channel estimation in a time domain in a network according to this disclosure.

DETAILED DESCRIPTION

Figure 1:
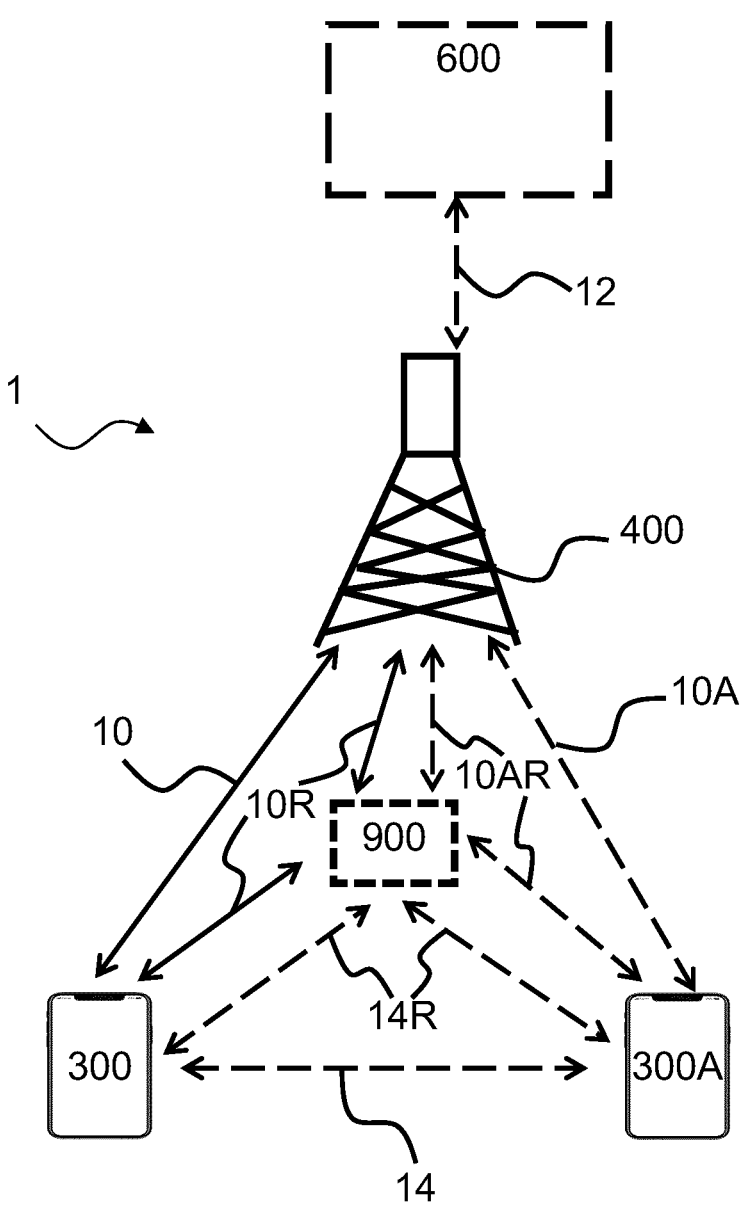
FIG. 1 is a diagram illustrating an example wireless communication system comprising an example network node and an example wireless device according to this disclosure.

Various examples and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the examples. They are not intended as an exhaustive description of the disclosure or as a limitation on the scope of the disclosure. In addition, an illustrated example need not have all the aspects or advantages shown. An aspect or an advantage described in conjunction with a particular example is not necessarily limited to that example and can be practiced in any other examples even if not so illustrated, or if not so explicitly described.

The figures are schematic and simplified for clarity, and they merely show details which aid understanding the disclosure, while other details have been left out. Throughout, the same reference numerals are used for identical or corresponding parts.

FIG. 1 is a diagram illustrating an example wireless communication system 1 comprising an example network node 400, an example first wireless device 300, an example second wireless device 300A, an example core network (CN) node 600 and an example repeater node 900 according to this disclosure.

As discussed in detail herein, the present disclosure relates to a wireless communication system 1 comprising a cellular system, for example, a 3GPP wireless communication system. The wireless communication system 1 comprises one or more wireless device(s) 300, 300A, a network node 400 and/or a core network (CN) node 600.

A network node disclosed herein refers to a radio access network node operating in the radio access network, such as a base station, an evolved Node B, eNB, gNB in NR. In one or more examples, the RAN node is a functional unit which may be distributed in several physical units.

A core network, CN, node disclosed herein refers to a network node operating in the core network, such as in the Evolved Packet Core Network, EPC, and/or a 5G Core Network, 5GC. Examples of CN nodes in EPC include a Mobility Management Entity, MME.

The wireless communication system 1 described herein may comprise one or more wireless devices 300, 300A, and/or one or more network nodes 400, such as one or more of: a base station, an eNB, a gNB and/or an access point.

A wireless device may refer to a mobile device and/or a user equipment, UE.

The wireless devices 300, 300A may be configured to communicate with the network node 400 via a wireless link (or radio access link) 10, 10A.

The wireless devices 300, 300A may, in one or more examples, be configured to communicate with each other via a wireless link (such as a side-link) 14.

The wireless communication system 1 described herein may comprise a repeater node 900. The repeater node 900 may be an intermediate node receiving a transmission from a transmitting node and repeating, such as relaying, reflecting, amplifying, beam steering, and/or decoding/re-encoding, the transmission to a receiving node. The repeater node may herein also be referred to as a relay node.

In one or more examples, the repeater node 900 may repeat a communication over the wireless link 10 between the RAN node 400 and the first wireless device 300. The repeated communication is in FIG. 1 indicated as 10R.

In one or more examples, the repeater node 900 may repeat a communication over the wireless link 10A between the RAN node 400 and the second wireless device 300A. The repeated communication is in FIG. 1 indicated as 10AR. In one or more examples, the repeater node 900 may repeat a communication over the side-link 14 between the first wireless device 300 and the second wireless device 300A. The repeated communication is in FIG. 1 indicated as 14R.

In one or more example methods, the repeater node 900 is any type of node being configured to relay a transmission. The repeater node 900 may, in one or more examples, be one or more of a reflective surface, a smart repeater, a smart amplifier, an intelligent surface, a third wireless device operating in side-link with the first wireless node and/or the second wireless node. A smart repeater and/or a smart amplifier herein means that the repeater and/or amplifier has a control plane to a first wireless node (such as to a network node, such as a gNB), so that the first wireless node can configure the repeater and/or the amplifier, for example by switching the repeater and/or the amplifier on or off on slot basis. In one or more example methods, the repeater node 900 has a control plane to a first wireless node, so that the first wireless node can configure the repeater node 900, for example by switching the repeater node 900 on or off on a slot basis This allows the first wireless node to, for example, amplify only selected signaling periods, such as signaling periods that, based on defined criteria, are suitable to be amplified.

In the following, an example scenario describing the problem solved by the current disclosure will be provided. If a communication signal contains a plurality of reference signals, such as Demodulation Reference Signals (DMRS) in consecutive slots or in a single slot, then the propagation channel can be estimated using all DMRS in over multiple repetitions of the reference signals, such as over multiple slots or in a single slot, jointly. This is referred to as JCE and significantly outperforms slot-by-slot channel estimation based on only the DMRSs in a current slot.

A problem may arise if a transmitter, such as a transmitting node, introduces a random phase change over multiple repetitions of the transmission of reference signals, such as within a slot or between consecutive slots. Typically, a radio network node, such as a gNB, may not introduce any random phase changes, as it is a highly expensive piece of hardware.

However, other wireless nodes, such as a wireless device may introduce random phase changes. One example of an event causing a random phase change is when a power amplifier of the wireless device is switched on/off between transmissions. For repetition type A, the reference signal may only have one repetition per slot. For repetition type B, there may be multiple repetitions of the reference signal within a slot or the repetitions may not align with the boundary of the slots. Hence, a phase change may not only occur between the slots but may also occur within a slot.

The problem may increase in cases where a smart repeater (SR) is added to the wireless communication system. A smart repeater is defined as a repeater which has a control plane to a gNB, so that the gNB can switch the repeater on or off on a slot basis, for example to only amplify suitable signaling periods, such as signaling periods associated with the target WD. Due to resource scheduling not all slots may contain signals to the target WD. If such on/off switching of the smart repeater occurs, abrupt phase changes may be introduced, and the receiving end cannot perform JCE. The receiving node may assume that JCE is available and may try to perform JCE on the channel affected by phase changes.

Similar problems also occur with legacy repeaters that do not have a control plane with the gNB. For such repeater nodes, adjustments at the repeater, such as power adjustments and beam adjustments, may be initiated autonomously by the repeater, or communicated through a third party interface. In any event, abrupt phase changes to repeated signals might show up. Thereby rendering JCE impossible.

Accordingly, the current disclosure provides devices and methods for enabling and/or handling joint channel estimation in a time domain in a network, which may mitigate, alleviate, or address the shortcomings existing and may provide an improved channel estimation.

According to the current disclosure, additional control signaling is introduced between a first wireless node, such as a gNB, and a second wireless node, such as a wireless device. According to one or more example methods disclosed herein, the first wireless node sends a signal to the second wireless node indicating that DL and/or UL JCE is not possible, such as due to random phase changes associated with a repeater node, such as a smart repeater.

In one or more example methods according to the current disclosure, the first wireless node sends an indication to the second wireless device indicating where the phase changes occur. For example, this may be a message that indicates that as long as downlink signals are back-to-back, there is no phase and/or amplitude shift, but for downlink signals that are not back-to-back, there might be. Non-back-to-back herein means that there is a disruptive event, such as a procedure being performed, between two transmissions.

In one or more example scenarios, there may be a direct propagation path from the first wireless node to the second wireless node in addition to a propagation path synthesized by the repeater mode, such as a propagation path created by the repeater node or a propagation path that involves the repeater node. In such a case, the first wireless node may indicate to the second wireless node that only the signal arriving from the repeater node may suffer from a phase and/or amplitude change. This is beneficial to the second wireless node as it can then apply JCE to the direct propagation path from the first wireless node, while JCE may be deactivated for the propagation path synthesized by the repeater node.

In one or more examples according to this disclosure, the first wireless node configures the repeater node with a time duration, such as a time window, associated with JCE. During such a time duration the repeater node may be configured not to perform procedures, such as change any configuration, that may influence phase or amplitude properties of the channel and may cause phase or amplitude discontinuities. Configuration changes that may influence phase or amplitude properties of the channel may comprise changing one or more of a beam direction, a gain setting, a timing advance, power, adjustment of frequency and/or phase, and a transmission direction, such as switching between UL and DL (possibly comprising a Power Amplifier (PA) power switching).

In one or more example methods according to the current disclosure, the repeater node reports a capability, such as sends a capability report, indicating that the repeater node is capable of maintaining phase and/or amplitude continuity through an on-off switching of the repeater node. The capability may in one or more example methods according to this disclosure indicate that the repeater node is capable of maintaining phase and/or amplitude continuity in other circumstances, such as during adjustment of power, during adjustment of frequency/phase and during adjustment of beam direction.

The methods and devices according to the current disclosure will be described in further detail in the following.

Figure 5:
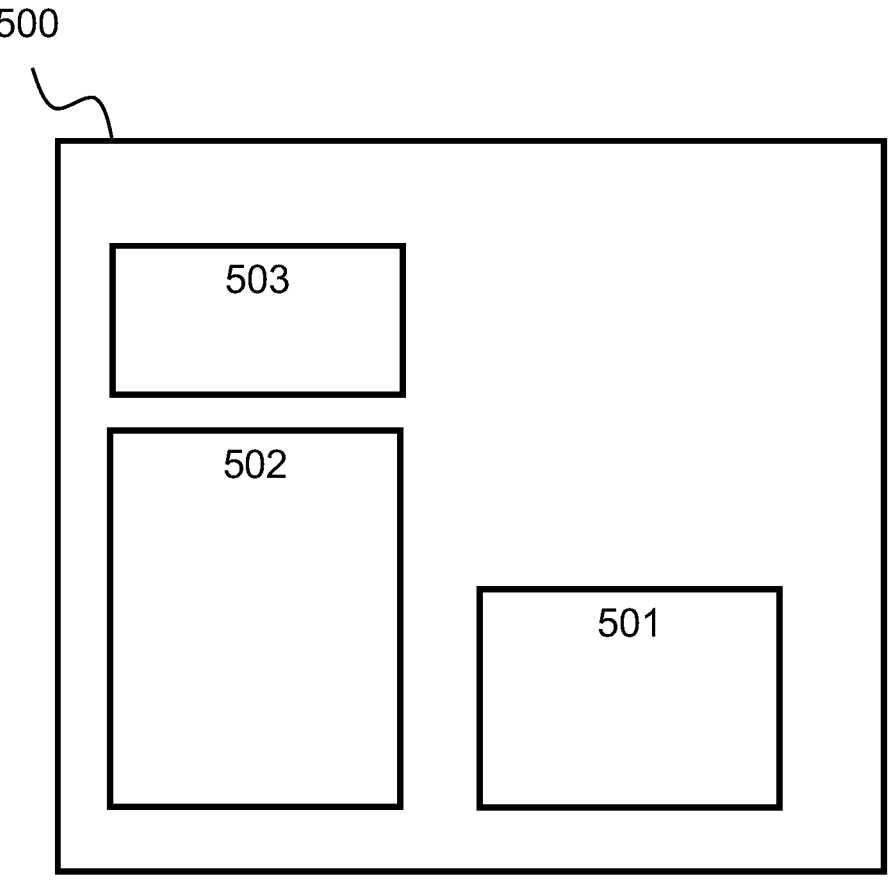
FIG. 5 is a block diagram illustrating an example first wireless node according to this disclosure.

FIG. 2 shows a flow diagram of an example method 1000, performed by a first wireless node, such as the first wireless node 500 of FIG. 5, for enabling joint channel estimation in a time domain in a network according to the disclosure.

The method 1000 comprises determining S1001 a presence of a repeater node in a transmission path between the first wireless node and a second wireless node. The repeater node is enabled to relay a transmission between the first wireless node and the second wireless node. In other words, the repeater node may be configured to relay, such as repeat, any transmission reaching the repeater node, such as a transmission between the first wireless node and the second wireless node.

In one or more example methods, the determining S1001 comprises receiving S1001A, from the repeater node, a capability message, the capability message indicating a capability of the repeater node. In one or more example methods, the capability of the repeater node comprises a capability to maintain a phase continuity and/or a power consistency for a transmission duration. Consistency herein does not mean completely unchanged, but rather means a consistency within a certain tolerance, such as a phase change within +−x degrees, and/or an amplitude change within +−y dB. In one or more example methods, the capability message may indicate that the repeater node is capable of maintaining phase and/or amplitude continuity through one or more of an on-off switching of the repeater node. In one or more example methods, the capability may indicate that the repeater node is capable of maintaining phase and/or amplitude continuity in other circumstances, such as during one or more of adjustment of power, adjustment of frequency, adjustment of phase, and adjustment of beam direction. In one or more example methods, the capability may indicate that the repeater node can avoid changing any configuration that influences phase and/or amplitude for a time duration. The time duration may be synchronized with one of the other nodes or simply set to a low update rate.

In one or more example methods, the repeater node is any type of node being configured to relay a transmission. The repeater node may, in one or more examples, be one or more of a reflective surface, a Radio Frequency (RF) repeater that the network is aware of, a smart repeater, a smart amplifier, an intelligent surface, a wireless device communicating in side-link, such as via a PC5 interface, with the first wireless node and/or the second wireless node, and an Integrated Access and Backhaul (IAB). When an operator deploys an RF repeater, the operator can indicate the presence of the RF repeater to the gNB either explicitly or implicitly. A smart repeater and/or a smart amplifier herein may be seen as a repeater and/or an amplifier that has a control plane to a first wireless node (such as to a network node, such as a gNB), so that the first wireless node can configure the repeater and/or the amplifier, for example by switching the repeater and/or the amplifier on or off on slot basis. This allows the first wireless node to, for example, amplify only selected signaling periods, such as signaling periods that, based on defined criteria, are suitable to be amplified.

In one or more example methods, the method comprises determining a condition, such as a state, associated with phase continuity and/or power consistency of the transmission between the first wireless node and the second wireless node, based on the capability message received from the repeater node. The condition may be a condition associated with the repeater node enabled to relay the transmission between the first wireless node and the second wireless node.

The method 1000 comprises transmitting S1005, to the second wireless node, an indication indicating a condition, such as a state, associated with phase continuity and/or power consistency of the transmission between the first wireless node and the second wireless node. In one or more example methods, the condition is associated with the repeater node enabled to relay the transmission between the first wireless node and the second wireless node. The transmission between the first wireless node and the second wireless node may, in one or more example methods, be a transmission relayed via the repeater node. In one or more example methods, the transmitting (S1005) may be performed in accordance with a determination that a repeater node is present in a transmission path between the first wireless node and a second wireless node. In one or more example methods, the condition, such as the state, associated with phase continuity and/or power consistency of the transmission between the first wireless node and the second wireless node is determined based on the capability message received from the repeater node.

In one or more example methods, the condition associated with phase continuity and/or power consistency comprises that the phase continuity and/or the power consistency is maintained. In other words, the indication may indicate that the phase continuity and/or power consistency of the transmission between the first wireless node and the second wireless node can be maintained for the transmission.

In one or more example methods, the condition associated with phase continuity and/or power consistency comprises that the phase continuity and/or the power consistency is maintained for a time duration. In other words, the indication may indicate that the phase continuity and/or power consistency of the transmission between the first wireless node and the second wireless node can be maintained for a defined time duration, such as for a number of seconds or a number of time slots. The repeater node and the first and the second wireless nodes may have mutual understanding of the time domain window in which JCE applies. For example, the repeater node and the first and the second wireless nodes may be synchronized e.g., using a reference time.

In one or more example methods, the condition associated with phase continuity and/or power consistency comprises that the phase continuity and/or the power consistency is not maintained. In other words, the indication may indicate that the phase continuity and/or power consistency of the transmission between the first wireless node and the second wireless node cannot be maintained, for example due to random phase changes associated with the repeater node.

In one or more example methods, the condition associated with phase continuity and/or power consistency comprises that the phase continuity and/or the power consistency is not maintained for a part of a signal transmitted between the first wireless node and the second wireless node. In one or more example methods, the part of the signal may be a transmission and/or propagation of the signal via a specific propagation path, such as via a non-line of sight (nLOS) path. In one or more examples, the part of the signal is the entire signal.

In one or more example methods, the method 1000 comprises transmitting S1003, to the repeater node, a message indicative of a time duration for which the phase continuity and/or the power consistency is to be maintained by the repeater node. The time duration may in one or more example methods be a time window associated with JCE. During such a time window the repeater node is not to change any configuration that may influence phase and/or amplitude properties of a channel, such as of a channel over which JCE is performed. Changes that may influence phase and/or amplitude properties of the channel may be changes to one or more of a beam direction, a gain setting, and a transmission direction (such as switching between UL/DL transmission). In one or more example methods, the message indicative of the time duration comprises a synchronization signal, so that the repeater node knows the location of the time durations, such as when in time the time duration starts.

In one or more examples, a phase and/or amplitude jump in the transmission may be associated with the repeater node changing beams, such as transmission and/or reception beams. The message indicative of a time duration for which the phase continuity and/or the power consistency is to be maintained by the repeater node may indicate to the repeater node that it should not perform any changes, such as not change beams, for the indicated time duration.

In one or more example methods, the first wireless node 500 is a wireless device, such as the wireless device 300 or 300A in FIG. 1, and the second wireless node is a radio network node, such as the network node 400 in FIG. 1. In other words, the wireless device may be transmitting a signal to the radio network node in UL, and the radio network node may perform channel estimation.

In one or more example methods, the first wireless node 500 is a radio network node, such as the network node 400 in FIG. 1, and the second wireless node is a wireless device, such as the wireless device 300 or 300A in FIG. 1. In other words, the radio network node may be transmitting a signal to the wireless device in DL, and the wireless device may perform channel estimation.

In one or more example methods, the first wireless node 500 is a first wireless device, such as the wireless device 300 in FIG. 1 and the second wireless node is a second wireless device, such as the wireless device 300A in FIG. 1. In other words, the first wireless device may be transmitting a signal to the second wireless device in Side-Link, and the radio network node may perform channel estimation.

Figure 6:
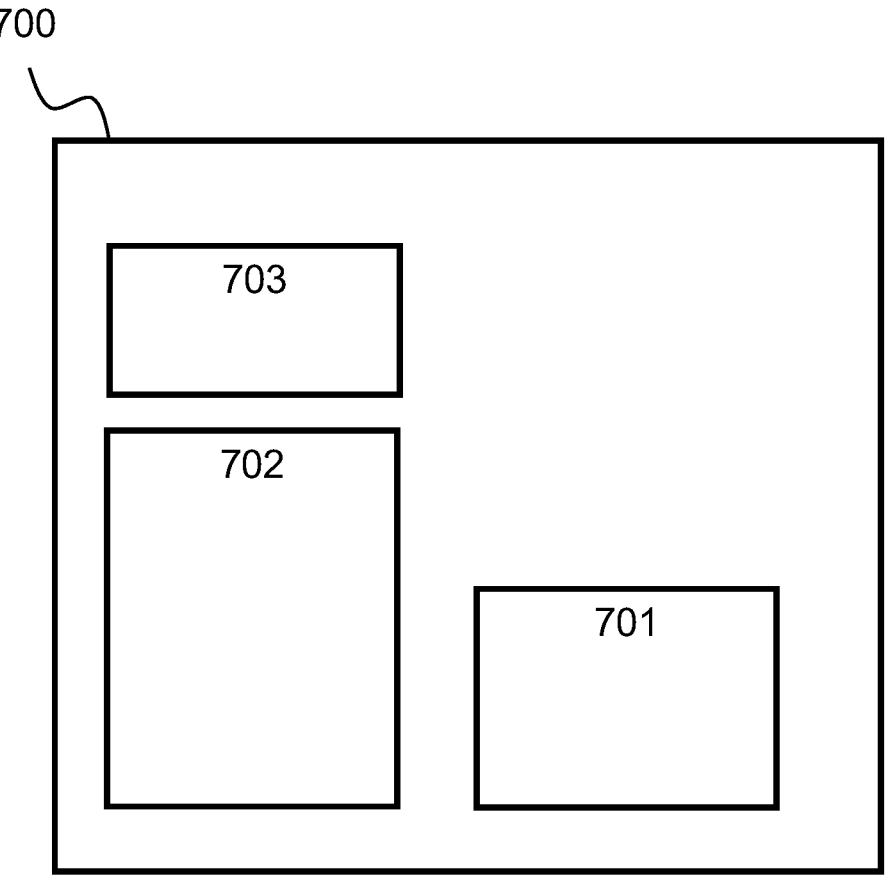
FIG. 6 is a block diagram illustrating an example second wireless node according to this disclosure.

FIG. 3 shows a flow diagram of an example method 2000, performed by a second wireless node, such as the wireless node 700 of FIG. 6, for handling joint channel estimation in a time domain in a network according to the disclosure.

The method 2000 comprises obtaining S2001 an indication indicating a condition, such as a state, associated with phase continuity and/or power consistency of a transmission between the first wireless node and the second wireless node. The condition is associated with a relay node, such as a repeater node, such as the repeater node 900 of FIG. 1, enabled to relay the transmission between the first wireless node and the second wireless node.

In one or more example methods, obtaining S2001 may comprise receiving S2001A the indication, such as from another wireless node, such as from the first wireless node.

In one or more example methods, obtaining S2001 comprises determining S2001B the condition by the second wireless node. In one or more example methods, the determining S2001B comprises receiving S2001BB, from the repeater node, a capability message, the capability message indicating a capability of the repeater node. In one or more example methods, the capability of the repeater node comprises a capability to maintain a phase continuity and/or a power consistency for a transmission duration.

In one or more example methods, the condition associated with phase continuity and/or power consistency comprises that the phase continuity and/or the power consistency is maintained. In other words, the indication may indicate that the phase continuity and/or power consistency of the transmission between the first wireless node and the second wireless node can be maintained for the transmission.

In one or more example methods, the condition associated with phase continuity and/or power consistency comprises that the phase continuity and/or the power consistency is maintained for a time duration. In other words, the indication may indicate that the phase continuity and/or power consistency of the transmission between the first wireless node and the second wireless node can be maintained for a defined time duration, such as for a number of seconds or a number of time slots.

In one or more example methods, the condition associated with phase continuity and/or power consistency comprises that the phase continuity and/or the power consistency is not maintained. In other words, the indication may indicate that the phase continuity and/or power consistency of the transmission between the first wireless node and the second wireless node cannot be maintained, for example due to random phase changes associated with the repeater node.

In one or more example methods, the condition associated with phase continuity and/or power consistency comprises that the phase continuity and/or the power consistency is not maintained for a part of the signal transmitted between the first wireless node and the second wireless node. In one or more example methods, the part of the signal may be a transmission and/or propagation of the signal via a specific propagation path, such as via a non-line of sight (nLOS) path. A signal propagating via a nLOS path is a signal that doesn't propagate directly from a transmitter to a receiver, but that may be reflected by on one or more objects on its way from the transmitter to the receiver. Some of these obstacles may reflect certain radio frequencies, while some obstacles may absorb or distort the signals.

The method 2000 comprises estimating S2003 a channel condition of the transmission between the first wireless node and the second wireless node based on the indicated condition.

In one or more example methods, such as when the condition associated with phase continuity and/or power consistency comprising that the phase continuity and/or the power consistency is maintained, estimating S2003 comprises estimating S2003A the channel condition jointly, such as performing JCE, based on a plurality of reference signals separated in a time domain. The plurality of reference signals is comprised in the transmission between the first wireless node and the second wireless node. In other words, when the second wireless node receives an indication that phase continuity and/or power consistency is maintained for the transmission from the first wireless node, the second wireless node is enabled to perform JCE. Enabled to perform herein means that the second wireless node can decide to perform JCE. Thereby the quality of the channel estimation may be improved.

In one or more example methods, such as when the condition associated with phase continuity and/or power consistency comprises that the phase continuity and/or the power consistency is maintained for a time duration, estimating S2003A the channel condition jointly based on a plurality of reference signals separated in the time domain is performed during the time duration. In one or more example methods, the second wireless node is enabled to perform JCE on the plurality of reference signals separated in the time domain during the time duration.

In one or more example methods, such as when the condition associated with phase continuity and/or power consistency comprises that the phase continuity and/or the power consistency is not maintained, estimating S2003 comprises estimating S2003B the channel condition based on a single reference signal of the transmission between the first wireless node and the second wireless node.

In one or more example methods, such as when the condition associated with phase continuity and/or power consistency comprises that the phase continuity and/or the power consistency is not maintained for a part of the signal transmitted between the first wireless node and the second wireless node, the channel estimation is performed based on a single reference signal of the part of the signal transmitted between the first wireless node and the second wireless node.

In one or more example methods, the second wireless device may thus perform JCE over a plurality of reference signals on parts of the signal where phase continuity and/or the power consistency is maintained and on a single reference signal on the part of the signal where phase continuity and/or the power consistency is not maintained.

In one or more example methods, the part of the signal is propagated via a non-line of sight path.

In one or more example methods, the reference signal is a pilot signal, such as one or more of a Demodulation Reference Signal (DMRS), a Sounding Reference Signal (SRS), a Channel State Information Reference Signal (CSI-RS), a Phase Tracking Reference Signal (PTRS), and a Positioning Reference Signal (PRS). The DMRS may be transmitted in UL and/or DL.

In one or more example methods, the obtaining S2001 comprises receiving 2001A the indication from a first wireless node.

In one or more example methods, the first wireless node 500 is a wireless device, such as the wireless device 300 or 300A in FIG. 1, and the second wireless node 700 is a radio network node, such as the network node 400 in FIG. 1. In other words, the wireless device may be transmitting a signal to the radio network node in UL, and the radio network node may perform channel estimation.

In one or more example methods, the first wireless node 500 is a radio network node, such as the network node 400 in FIG. 1, and the second wireless node 700 is a wireless device, such as the wireless device 300 or 300A in FIG. 1. In other words, the radio network node may be transmitting a signal to the wireless device in DL, and the wireless device may perform channel estimation.

In one or more example methods, the first wireless node is a first wireless device 500, the wireless device 300 in FIG. 1 and the second wireless node 700 is a second wireless device, such as the wireless device 300A in FIG. 1. In other words, the first wireless device may be transmitting a signal to the second wireless device in Side-Link, and the radio network node may perform channel estimation.

Figure 7:
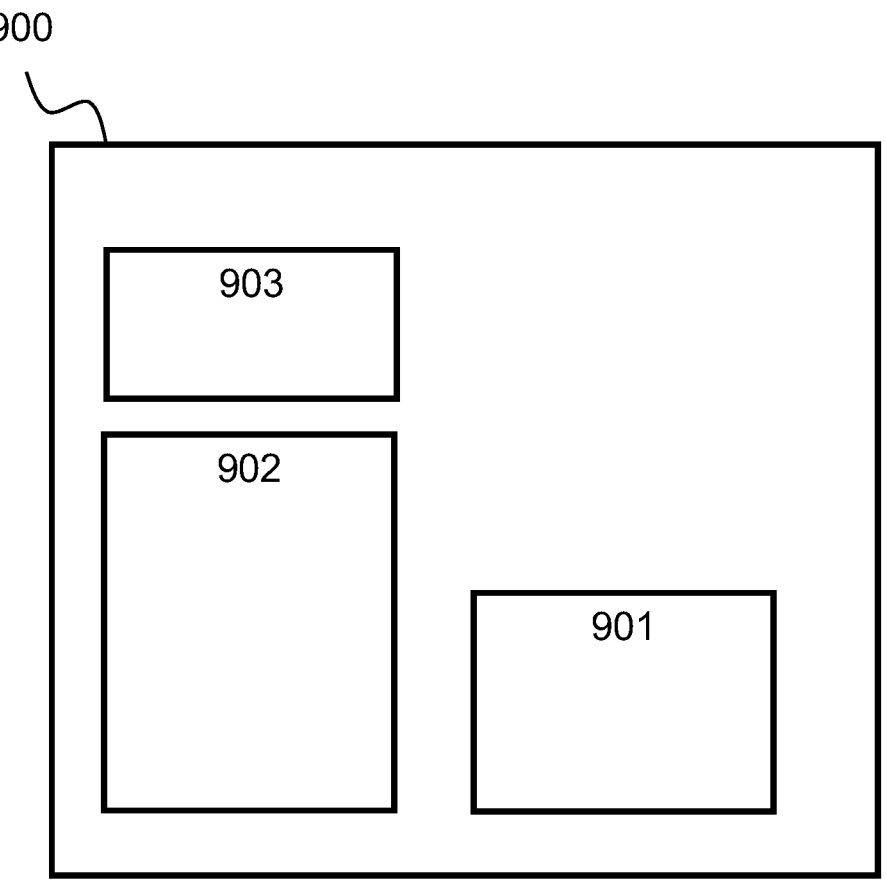
FIG. 7 is a block diagram illustrating an example repeater node according to this disclosure.

FIG. 4 shows a flow diagram of an example method 3000, performed by a repeater node, such as the repeater node 900 disclosed in FIG. 1 and/or FIG. 7, according to the disclosure. The method 3000 may be performed for example, for enabling joint channel estimation in a time domain in a network. The method 3000 may be performed by a repeater node, such as repeater node of FIG. 1 and FIG. 7.

The method 3000 comprises receiving S3003, from a first network node, a message indicative of a time duration for which a phase continuity and/or the power consistency is to be maintained by the repeater node. The message may be transmitted using one or more of a control signaling message, such as a Radio Resource Control (RRC) message, a Medium Access Control (MAC) message, via L1 (Phy) layer signaling, and via a control plane in sidelink, such as via a PC5-RRC message.

The method 3000 comprises refraining S3005 from performing one or more procedures, such as power adjustments and/or beam adjustments, causing phase discontinuity and/or power inconsistency in a transmission between the first wireless node and a second wireless node relayed by the repeater node during the time duration. The procedures may in one or more examples comprise changing one or more of a beam direction, a gain setting, a timing advance, power, adjustment of frequency and/or phase, a beam direction, and a transmission direction, such as switching between UL and DL (comprising a Power Amplifier (PA) on/off switching). In one or more example methods, the one or more procedures may be one or more physical layer procedures for control signaling, such as defined in 3GPP TS 38.213, V16.7.0, and/or one or more physical layer procedures for data signaling, such as defined in 3GPP TS 38.214, V16.7.0.

In one or more example methods, the method 3000 comprises transmitting S3001, to the first network node, a capability message, the capability message indicating a capability of the repeater node.

In one or more example methods, the capability of the repeater node comprises a capability to maintain a phase continuity and/or a power consistency for a transmission duration. In one or more example methods, the capability of the repeater may indicate that the repeater node is capable of refraining, within a time, duration, from reconfiguring itself each time it receives a sync signal (per configuration).

In one or more example methods, the one or more procedures comprise adjustment of timing advance of the transmission, adjustment of transmission power, adjustment of frequency of the transmission, adjustment of phase of the transmission, adjustment of beam direction of the transmission, and/or switching between uplink (UL) and downlink (DL) transmission.

In one or more example methods, refraining S3005 comprises refraining from performing the one or more procedures with a maximum frequency. For example, the repeater node 900 may perform the one or more procedures only with a limited, such as a maximum, rate (e.g., 1/sec, such as one change per second).

FIG. 5 shows a block diagram of an example first wireless node 500 according to the disclosure. The first wireless node 500 comprises memory circuitry 501, processor circuitry 502, and a wireless interface 503. The first wireless node 500 may be configured to perform any of the methods disclosed in FIG. 2. In other words, the first wireless node 500 may be configured for enabling joint channel estimation in a time domain in a network. The first wireless node 500 may be a transmitting node, transmitting communication from the second wireless node. When the transmission is in UL or in Side-Link the first wireless node 500 may be a wireless device, such as wireless device 300 or 300A of FIG. 1. When the transmission is in DL the first wireless node 500 may be a network node, such as radio network node 400 of FIG. 1.

The first wireless node 500 is configured to determine (such as using the processor circuitry 502) a presence of a repeater node in a transmission path between the first wireless node and a second wireless node. The repeater node is enabled to relay a transmission between the first wireless node and the second wireless node.

The first wireless node 500 is configured to transmit (such as using the wireless interface 503), to the second wireless node, an indication indicating a condition associated with phase continuity and/or power consistency of the transmission between the first wireless node and the second wireless node.

The wireless interface 503 is configured for wireless communications via a wireless communication system, such as a 3GPP system, such as a 3GPP system supporting one or more of: New Radio, NR, Narrow-band IoT, NB-IoT, and Long Term Evolution-enhanced Machine Type Communication, LTE-M, millimeter-wave communications, such as millimeter-wave communications in licensed and/or unlicensed bands, such as device-to-device millimeter-wave communications in licensed bands and/or unlicensed bands.

Processor circuitry 502 is optionally configured to perform any of the operations disclosed in FIG. 2 (such as any one or more of S1001A, S1003). The operations of the first wireless node 500 may be embodied in the form of executable logic routines (for example, lines of code, software programs, etc.) that are stored on a non-transitory computer readable medium (for example, memory circuitry 501) and are executed by processor circuitry 502).

Furthermore, the operations of the first wireless node 500 may be considered a method that the first wireless node 500 is configured to carry out. Also, while the described functions and operations may be implemented in software, such functionality may also be carried out via dedicated hardware or firmware, or some combination of hardware, firmware and/or software.

Memory circuitry 501 may be one or more of a buffer, a flash memory, a hard drive, a removable media, a volatile memory, a non-volatile memory, a random access memory (RAM), or another suitable device. In a typical arrangement, memory circuitry 501 may include a non-volatile memory for long term data storage and a volatile memory that functions as system memory for processor circuitry 502. Memory circuitry 501 may exchange data with processor circuitry 502 over a data bus. Control lines and an address bus between memory circuitry 501 and processor circuitry 502 also may be present (not shown in FIG. 5). Memory circuitry 501 is considered a non-transitory computer readable medium.

Memory circuitry 501 may be configured to store information, such as the condition of the transmission, the capability of the repeater node, and/or the time duration for which the phase continuity and/or the power consistency is to be maintained by the repeater node, in a part of the memory.

FIG. 6 is a block diagram of an example second wireless node 700 according to the disclosure. The second wireless node 700 comprises memory circuitry 701, processor circuitry 702, and a wireless interface 703. The second wireless node 700 may be configured to perform any of the methods disclosed in FIG. 3. In other words, the second wireless node may be configured for handling joint channel estimation in a time domain in a network. The second wireless node 700 may be a receiving node, receiving communication from the first wireless node. When the transmission is in DL or in Side-Link the second wireless node 700 may be a wireless device, such as wireless device 300 or 300A of FIG. 1. When the transmission is in UL the second wireless node 700 may be a network node, such as radio network node 400 of FIG. 1.

The second wireless node 700 is configured to obtain (such as using the wireless interface 703) an indication indicating a condition associated with phase continuity and/or power consistency of a transmission between the first wireless node and the second wireless node.

In one or more example second wireless nodes, the condition is associated with a relay node, such as the repeater node, such as the repeater node 900 of FIG. 1, enabled to relay the transmission between the first wireless node and the second wireless node.

The second wireless node 700 is configured to estimate (such as using the processor circuitry 702) a channel condition of the transmission between the first wireless node and the second wireless node based on the indicated condition.

The wireless interface 703 is configured for wireless communications via a wireless communication system, such as a 3GPP system, such as a 3GPP system supporting one or more of: New Radio, NR, Narrow-band IoT, NB-IoT, and Long Term Evolution-enhanced Machine Type Communication, LTE-M, millimeter-wave communications, such as millimeter-wave communications in licensed and/or unlicensed bands, such as device-to-device millimeter-wave communications in licensed and/or unlicensed bands.

Processor circuitry 702 is optionally configured to perform any of the operations disclosed in FIG. 3 (such as any one or more of S2001A, S2001B, S2001BB, S2003A, S2003B). The operations of the second wireless node 700 may be embodied in the form of executable logic routines (for example, lines of code, software programs, etc.) that are stored on a non-transitory computer readable medium (for example, memory circuitry 701) and are executed by processor circuitry 702).

Furthermore, the operations of the second wireless node 700 may be considered a method that the second wireless node 700 is configured to carry out. Also, while the described functions and operations may be implemented in software, such functionality may also be carried out via dedicated hardware or firmware, or some combination of hardware, firmware and/or software.

Memory circuitry 701 may be one or more of a buffer, a flash memory, a hard drive, a removable media, a volatile memory, a non-volatile memory, a random access memory (RAM), or other suitable device. In a typical arrangement, memory circuitry 701 may include a non-volatile memory for long term data storage and a volatile memory that functions as system memory for processor circuitry 702. Memory circuitry 701 may exchange data with processor circuitry 702 over a data bus. Control lines and an address bus between memory circuitry 701 and processor circuitry 702 also may be present (not shown in FIG. 6). Memory circuitry 701 is considered a non-transitory computer readable medium.

Memory circuitry 701 may be configured to store information, such as the indication of the condition associated with phase continuity and/or power consistency of a transmission, the estimated channel conditions, in a part of the memory.

FIG. 7 is a block diagram of an example repeater node 900 according to the disclosure. The repeater node 900 comprises memory circuitry 901, processor circuitry 902, and a wireless interface 903. The repeater node 900 may be configured to perform any of the methods disclosed in FIG. 4. In other words, the repeater node may be configured for enabling joint channel estimation in a time domain in a network. In one or more example methods, the repeater node 900 is any type of node being configured to relay a transmission. The repeater node 900 may, in one or more examples, be one or more of a reflective surface, a smart repeater, a smart amplifier, an intelligent surface, a wireless device operating in side-link with the first wireless node and/or the second wireless node. A smart repeater and/or a smart amplifier herein means that the repeater and/or amplifier has a control plane to a first wireless node (such as to a network node, such as a gNB), so that the first wireless node can configure the repeater and/or the amplifier, for example by switching the repeater and/or the amplifier on or off on a slot by slot basis. This allows the first wireless node to, for example, amplify only selected signaling periods, such as signaling periods that based on a defined criteria are suitable to be amplified.

The repeater node 900 is configured to receive (such as using the wireless interface 903), from the first wireless node, such as from a network node, a message indicative of a time duration for which a phase continuity and/or the power consistency is to be maintained by the repeater node.

The repeater node 900 is configured to refrain (such as using the processor circuitry 902) from performing one or more procedures causing phase discontinuity and/or power inconsistency in a transmission between the first wireless node and a repeater node relayed by the repeater node during the time duration.

The wireless interface 903 is configured for wireless communications via a wireless communication system, such as a 3GPP system, such as a 3GPP system supporting one or more of: New Radio, NR, Narrow-band IoT, NB-IoT, and Long Term Evolution-enhanced Machine Type Communication, LTE-M, millimeter-wave communications, such as millimeter-wave communications in licensed bands, such as device-to-device millimeter-wave communications in licensed, un-licensed and/or licensed-exempt bands.

Processor circuitry 902 is optionally configured to perform any of the operations disclosed in FIG. 4 (such as S3001). The operations of the repeater node 900 may be embodied in the form of executable logic routines (for example, lines of code, software programs, etc.) that are stored on a non-transitory computer readable medium (for example, memory circuitry 901) and are executed by processor circuitry 902).

Furthermore, the operations of the repeater node 900 may be considered a method that the repeater node 900 is configured to carry out. Also, while the described functions and operations may be implemented in software, such functionality may also be carried out via dedicated hardware or firmware, or some combination of hardware, firmware and/or software.

Memory circuitry 901 may be one or more of a buffer, a flash memory, a hard drive, a removable media, a volatile memory, a non-volatile memory, a random access memory (RAM), or other suitable device. In a typical arrangement, memory circuitry 901 may include a non-volatile memory for long term data storage and a volatile memory that functions as system memory for processor circuitry 902. Memory circuitry 901 may exchange data with processor circuitry 902 over a data bus. Control lines and an address bus between memory circuitry 901 and processor circuitry 902 also may be present (not shown in FIG. 7). Memory circuitry 901 is considered a non-transitory computer readable medium.

Memory circuitry 901 may be configured to store information, such as the time duration for which a phase continuity and/or the power consistency is to be maintained, in a part of the memory.

Examples of methods and products (first wireless node, second wireless node and repeater node) according to the disclosure are set out in the following items:

Item 1. A method, performed by a first wireless node, for enabling joint channel estimation in a time domain in a network, the method comprising:

determining (S1001) a presence of a repeater node in a transmission path between the first wireless node and a second wireless node, wherein the repeater node is enabled to relay a transmission between the first wireless node and the second wireless node, and transmitting (S1005), to the second wireless node, an indication indicating a condition associated with phase continuity and/or power consistency of the transmission between the first wireless node and the second wireless node.

Item 2. The method according to Item 1, wherein determining (S1001) comprises:

receiving (S1001A), from the repeater node, a capability message, the capability message indicating a capability of the repeater node.

Item 3. The method according to Item 2, wherein the capability of the repeater node comprises a capability to maintain a phase continuity and/or a power consistency for a transmission duration.

Item 4. The method according to any one of the previous Items, wherein the condition associated with phase continuity and/or power consistency comprises that the phase continuity and/or the power consistency is maintained.

Item 5. The method according to any one of Items 4, wherein the condition associated with phase continuity and/or power consistency comprises that the phase continuity and/or the power consistency is maintained for a time duration.

Item 6. The method according to any one of Items 1 to 3, wherein the condition associated with phase continuity and/or power consistency comprises that the phase continuity and/or the power consistency is not maintained.

Item 7. The method according to Item 6, wherein the condition associated with phase continuity and/or power consistency comprises that the phase continuity and/or the power consistency is not maintained for a part of a signal transmitted between the first wireless node and the second wireless node.

Item 8. The method according to Item 7, wherein the part of the signal is propagated via a non-line of sight path.

Item 9. The method according to any one of the Items 4 to 5, wherein the method comprises:

transmitting (S1003), to the repeater node, a message indicative of a time duration for which the phase continuity and/or the power consistency is to be maintained by the repeater node.

Item 10. The method according to any one of the previous Items, wherein the first wireless node is a wireless device, and the second wireless node is a radio network node.

Item 11. The method according to any one of the Items 1 to 9, wherein the first wireless node is a radio network node, and the second wireless node is a wireless device.

Item 12. The method according to any one of the Items 1 to 9, wherein the first wireless node is a first wireless device, and the second wireless node is a second wireless device.

Item 13. A method, performed by a second wireless node, for handling joint channel estimation in a time domain in a network, the method comprising:

obtaining (S2001) an indication indicating a condition associated with phase continuity and/or power consistency of a transmission between the first wireless node and the second wireless node, wherein the condition is associated with a repeater node enabled to relay the transmission between the first wireless node and the second wireless node, and estimating (S2003) a channel condition of the transmission between the first wireless node and the second wireless node based on the indicated condition.

Item 14. The method according to Item 13, wherein the condition associated with phase continuity and/or power consistency comprises that the phase continuity and/or the power consistency is maintained, and wherein estimating (S2003) comprises estimating (S2003A) the channel condition jointly based on a plurality of reference signals separated in a time domain, wherein the plurality of reference signals is comprised in the transmission between the first wireless node and the second wireless node.

Item 15. The method according to Item 14, wherein the condition associated with phase continuity and/or power consistency comprises that the phase continuity and/or the power consistency is maintained for a time duration, and wherein estimating (S2003A) the channel condition jointly based on a plurality of reference signals separated in the time domain is performed during the time duration.

Item 16. The method according to Item 13, wherein the condition associated with phase continuity and/or power consistency comprises that the phase continuity and/or the power consistency is not maintained.

Item 17. The method according to Item 16, wherein estimating (S2003) comprises estimating (S2003B) the channel condition based on a single reference signal of the transmission between the first wireless node and the second wireless node.

Item 18. The method according to Item 17, wherein the condition associated with phase continuity and/or power consistency comprises that the phase continuity and/or the power consistency is not maintained for a part of the signal transmitted between the first wireless node and the second wireless node, and wherein the channel estimation is performed based on a single reference signal of the part of the signal transmitted between the first wireless node and the second wireless node.

Item 19. The method according to Item 18, wherein the part of the signal is propagated via a non-line of sight path.

Item 20. The method according to any one of Items 14, 15 or 17, wherein the reference signal is a Demodulation Reference Signal, DMRS.

Item 21. The method according to any one of the Items 13 to 20, wherein obtaining (S2001) comprises receiving (S2001A) the indication from a first wireless node.

Item 22. The method according to any one of the Items 13 to 21, wherein the first wireless node is a wireless device, and the second wireless node is a radio network node.

Item 23. The method according to any one of the Items 13 to 21, wherein the first wireless node is a radio network node, and the second wireless node is a wireless device.

Item 24. The method according to any one of the Items 13 to 21, wherein the first wireless node is a first wireless device, and the second wireless node is a second wireless device.

Item 25. A method, performed by a repeater node, for enabling joint channel estimation in a time domain in a network, the method comprising:

receiving (S3003), from a first network node, a message indicative of a time duration for which a phase continuity and/or the power consistency is to be maintained by the repeater node, and refraining (S3005) from performing one or more procedures causing phase discontinuity and/or power inconsistency in a transmission between the first wireless node and a second wireless node relayed by the repeater node during the time duration.

Item 26. The method according to Item 25, wherein the method comprises:

transmitting (S3001), to the first network node, a capability message, the capability message indicating a capability of the repeater node.

Item 27. The method according to Item 26, wherein the capability of the repeater node comprises a capability to maintain a phase continuity and/or a power consistency for a transmission duration.

Item 28. The method according to any one of the Items 25 to 27, wherein the one or more procedures comprise adjustment of timing advance of the transmission, adjustment of transmission power, adjustment of frequency of the transmission, adjustment of phase of the transmission, adjustment of beam direction of the transmission, and/or switching between uplink and downlink transmission.

Item 29. The method according to any one of the Items 25 to 28, wherein refraining (S3005) comprises refraining from performing the one or more procedures with a maximum frequency.

Item 30. A first wireless node comprising memory circuitry, processor circuitry, and a wireless interface, wherein the first wireless node is configured to perform any of the methods according to any of Items 1-12.

Item 31. A second wireless node comprising memory circuitry, processor circuitry, and a wireless interface, wherein the second wireless node is configured to perform any of the methods according to any of Items 13-24.

Item 32. A repeater node comprising memory circuitry, processor circuitry, and a wireless interface, wherein the repeater node is configured to perform any of the methods according to any of Items 25-29.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-7 comprise some circuitries or operations which are illustrated with a solid line and some circuitries, components, features, or operations which are illustrated with a dashed line. Circuitries or operations which are comprised in a solid line are circuitries, components, features or operations which are comprised in the broadest example. Circuitries, components, features, or operations which are comprised in a dashed line are examples which may be comprised in, or a part of, or are further circuitries, components, features, or operations which may be taken in addition to circuitries, components, features, or operations of the solid line examples. It should be appreciated that these operations need not be performed in order presented. Furthermore, it should be appreciated that not all of the operations need to be performed. The example operations may be performed in any order and in any combination. It should be appreciated that these operations need not be performed in order presented. Circuitries, components, features, or operations which are comprised in a dashed line may be considered optional.

Other operations that are not described herein can be incorporated in the example operations. For example, one or more additional operations can be performed before, after, simultaneously, or between any of the described operations.

Certain features discussed above as separate implementations can also be implemented in combination as a single implementation. Conversely, features described as a single implementation can also be implemented in multiple implementations separately or in any suitable sub-combination. Moreover, although features may be described above as acting in certain combinations, one or more features from a claimed combination can, in some cases, be excised from the combination, and the combination may be claimed as any sub-combination or variation of any sub-combination It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the examples may be implemented at least in part by means of both hardware and software, and that several "means", "units" or "devices" may be represented by the same item of hardware.

The various example methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

The invention claimed is:

1. A method, performed by a first wireless node, for enabling joint channel estimation in a time domain in a network, the method comprising:

determining a presence of a repeater node in a transmission path between the first wireless node and a second wireless node, wherein the repeater node is enabled to relay a transmission between the first wireless node and the second wireless node; and transmitting, to the second wireless node, an indication indicating a condition associated with phase continuity and/or power consistency of the transmission between the first wireless node and the second wireless node, wherein the condition is associated with the determined presence of the repeater node enabled to relay the transmission between the first and second wireless nodes.

2. The method according to claim 1, wherein determining comprises:

receiving, from the repeater node, a capability message, the capability message indicating a capability of the repeater node, wherein the capability of the repeater node comprises a capability to maintain a phase continuity and/or a power consistency for a transmission duration.

3. The method according to claim 2, wherein the capability of the repeater node comprises a capability to maintain a phase continuity and/or a power consistency for a transmission duration.

4. The method according to claim 1, wherein the condition associated with phase continuity and/or power consistency comprises that the phase continuity and/or the power consistency is maintained.

5. The method according to claim 4, wherein the condition associated with phase continuity and/or power consistency comprises that the phase continuity and/or the power consistency is maintained for a time duration.

6. The method according to claim 1, wherein the condition associated with phase continuity and/or power consistency comprises that the phase continuity and/or the power consistency is not maintained.

7. The method according to claim 6, wherein the condition associated with phase continuity and/or power consistency comprises that the phase continuity and/or the power consistency is not maintained for a part of a signal transmitted between the first wireless node and the second wireless node.

8. The method according to claim 7, wherein the part of the signal is propagated via a non-line of sight path.

9. The method according to claim 4, wherein the method comprises:

transmitting, to the repeater node, a message indicative of a time duration for which the phase continuity and/or the power consistency is to be maintained by the repeater node.

10. The method according to claim 1, wherein the first wireless node is a wireless device, and the second wireless node is a radio network node.

11. The method according to claim 1, wherein the first wireless node is a radio network node, and the second wireless node is a wireless device.

12. The method according to claim 1, wherein the first wireless node is a first wireless device, and the second wireless node is a second wireless device.

13. A method, performed by a second wireless node, for handling joint channel estimation in a time domain in a network, the method comprising:

obtaining an indication indicating a condition associated with phase continuity and/or power consistency of a transmission between a first wireless node and the second wireless node, wherein the condition is associated with a repeater node enabled to relay the transmission between the first wireless node and the second wireless node; and estimating a channel condition of the transmission between the first wireless node and the second wireless node based on the indicated condition.

14. The method according to claim 13, wherein the condition associated with phase continuity and/or power consistency comprises that the phase continuity and/or the power consistency is maintained, and wherein estimating comprises estimating the channel condition jointly based on a plurality of reference signals separated in a time domain, wherein the plurality of reference signals is comprised in the transmission between the first wireless node and the second wireless node.

15. The method according to claim 14, wherein the condition associated with phase continuity and/or power consistency comprises that the phase continuity and/or the power consistency is maintained for a time duration, and wherein estimating the channel condition jointly based on a plurality of reference signals separated in the time domain is performed during the time duration.

16. The method according to claim 13, wherein the condition associated with phase continuity and/or power consistency comprises that the phase continuity and/or the power consistency is not maintained.

17. The method according to claim 16, wherein estimating comprises estimating the channel condition based on a single reference signal of the transmission between the first wireless node and the second wireless node.

18. The method according to claim 17, wherein the condition associated with phase continuity and/or power consistency comprises that the phase continuity and/or the power consistency is not maintained for a part of the signal transmitted between the first wireless node and the second wireless node, and wherein the channel estimation is performed based on a single reference signal of the part of the signal transmitted between the first wireless node and the second wireless node.

19. The method according to claim 18, wherein the part of the signal is propagated via a non-line of sight path.

20. A method, performed by a repeater node, for enabling joint channel estimation in a time domain in a network, the method comprising:

receiving, from a first network node, a message indicative of a time duration for which a phase continuity and/or the power consistency is to be maintained by the repeater node; and refraining from performing one or more procedures causing phase discontinuity and/or power inconsistency in a transmission between the first wireless node and a second wireless node relayed by the repeater node during the time duration.

\* \* \* \* \*